United States Patent [19]
Hoffman, Jr.

[11] Patent Number: 5,956,890
[45] Date of Patent: *Sep. 28, 1999

[54] FISHING TACKLE ITEM WITH FISHING LINE ATTACHMENT DEVICE

[76] Inventor: Henry R. Hoffman, Jr., 17222 Club Hill Dr., Dallas, Tex. 75248

[*] Notice: This patent is subject to a terminal disclaimer.

[21] Appl. No.: 09/010,092

[22] Filed: Jan. 21, 1998

[51] Int. Cl.⁶ .................................................. A01K 91/04
[52] U.S. Cl. .......................... 43/43.16; 43/44.83; 403/360
[58] Field of Search ................ 43/44.82, 44.83, 43/44.9, 43.16, 44.91, 42.25, 42.08, 42.49, 42.23, 42.36; 403/360

[56] References Cited

U.S. PATENT DOCUMENTS

| | | |
|---|---|---|
| 86,154 | 1/1869 | Hillz . |
| 319,655 | 6/1885 | Wright . |
| 1,333,101 | 3/1920 | Copper . |
| 3,878,637 | 4/1975 | Flower . |
| 3,898,760 | 8/1975 | Klein . |
| 4,092,796 | 6/1978 | Adams . |
| 4,914,792 | 4/1990 | Bradt . |
| 5,081,785 | 1/1992 | Kahng . |
| 5,638,633 | 6/1997 | Hoffman, Jr. ........................ 43/44.83 |

*Primary Examiner*—Thomas Price
*Attorney, Agent, or Firm*—Hovey, Williams, Timmons & Collins

[57] ABSTRACT

An attachment device for attaching a line to a fish hook includes a funnel-shaped portion, a tubular portion which is adapted to extend through an eye of a fish hook and a retaining portion which is adapted to engage the eye for restraining withdrawal of the tubular portion from the eye. A central opening extends through the funnel portion and the tubular portion, and the funnel facilitates inserting a line through the opening. A knot is tied in the line to prevent the line through the opening. A knot is tied in the line to prevent the line from being pulled back through the opening. In one embodiment, the attachment device is integrally formed as part of the fishing tackle item.

6 Claims, 3 Drawing Sheets

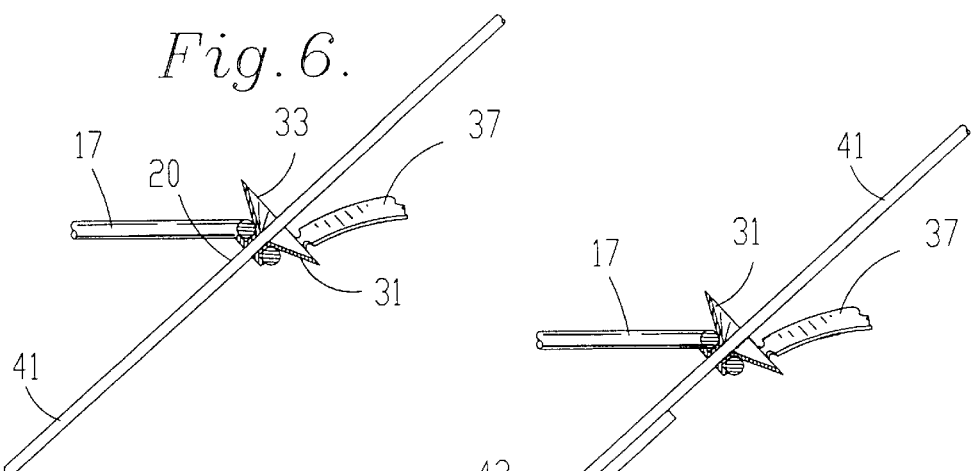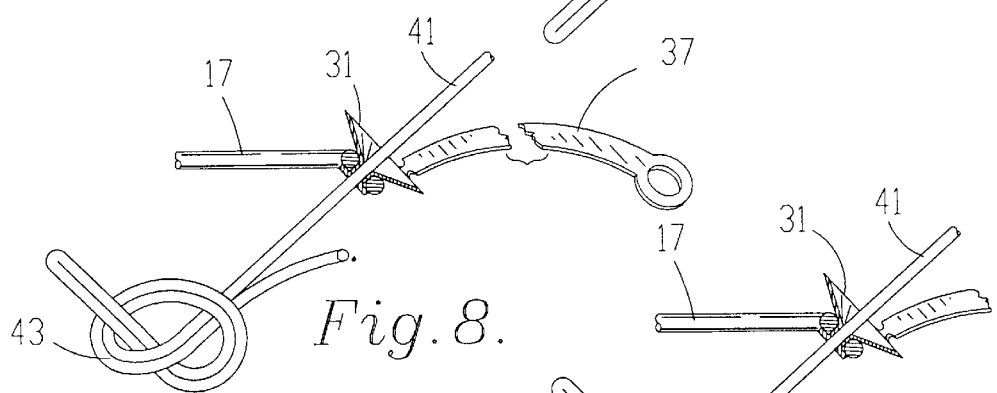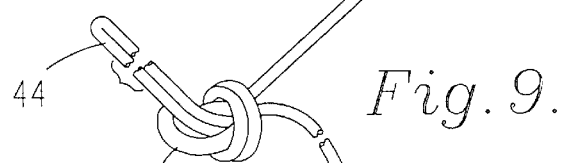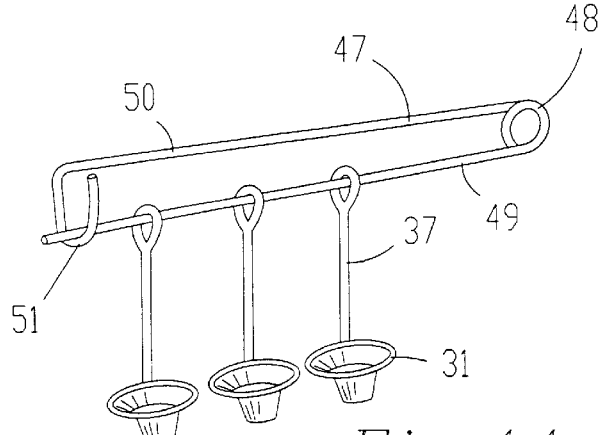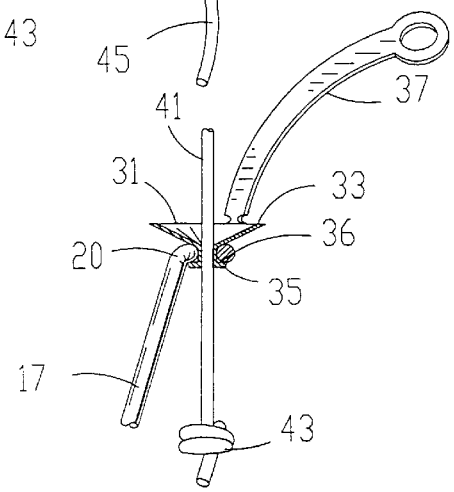

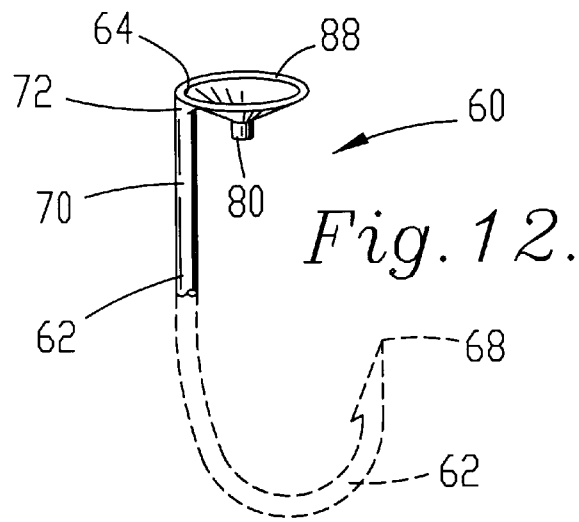
*Fig. 12.*
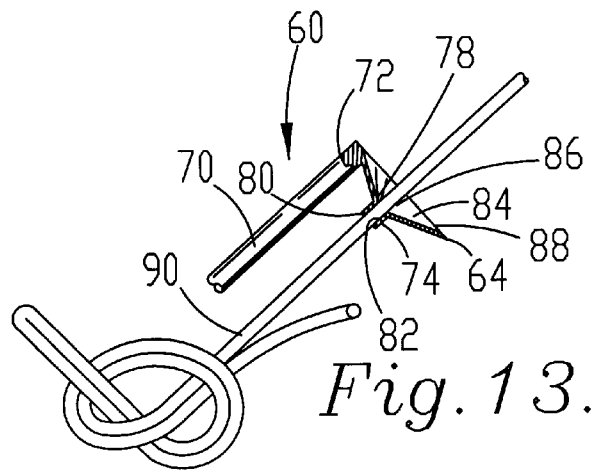
*Fig. 13.*
*Fig. 14.*
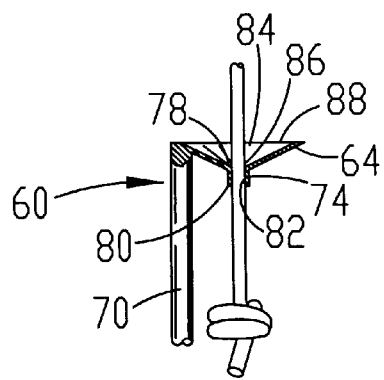

FISHING TACKLE ITEM WITH FISHING LINE ATTACHMENT DEVICE

RELATED APPLICATIONS

Not applicable.

FEDERALLY SPONSORED RESEARCH OR DEVELOPMENT

Not applicable.

BACKGROUND OF THE INVENTION

1. Field of the Invention

The invention relates to fish hooks, and more particularly to a device for facilitating attachment of a line, leader or tippet to a fish hook.

2. Description of the Prior Art

The usual method of attaching a line, leader, tippet, etc. (hereinafter referred to as a line for brevity) to a fish hook, for example, a fly fishing hook, is to push or thread the line through the eye of the hook, tie a cinch knot and clip off surplus material. Since flys are changed often or are lost, the usual method of attachment can be difficult and/or slow, especially in poor light, with small-eyed hooks. Further, some fishermen lack the manual dexterity which is required for attaching the line.

Previous improvements for attaching a line to a fish hook are generally directed to modifying the design of the hook. However, since millions of hooks are produced annually, it is highly desirably that an improved method of attachment be usable with any hook.

SUMMARY OF THE INVENTION

The invention provides an attaching device which can be used with any fish hook. The device includes a tubular portion which is inserted through the eye of a hook, a cone-like flared funnel on one end of the tubular portion and a retaining portion on the other end of the tubular portion which prevents inadvertent withdrawal of the tubular portion from the hook. The outside end of the funnel portion is substantially wider than the eye of the hook and a line can be easily inserted through the device simply by feeding the line into the funnel. After the end of the line passes through the device, a knot is tied in the line to prevent the line from being withdrawn through the device. A tab, string, or wire can be attached to the device for ease of storing and handling the device, and the tab can be removed after the device is installed.

In another embodiment, the attaching device is integrally formed with the fishing tackle item. In one example, the eye of a hook is die-stamped to present the funnel-shaped body.

BRIEF DESCRIPTION OF THE DRAWINGS

FIG. 6 is a fragmentary sectional view illustrating a line being inserted through the attaching device;

FIG. 7 is a view similar to FIG. 6 showing the line doubled back in preparation of tying a knot;

FIG. 8 illustrates a knot being tied in the line;

FIG. 9 illustrates the ends of the knot being clipped off;

FIG. 10 is an enlarged view of the attaching device, line and knot;

FIG. 11 illustrated a plurality of attaching device stored on a clip by the tabs;

FIG. 12 is a side elevational view of a fishing tackle apparatus in accordance with the present invention as another embodiment thereof;

FIG. 13 is a partial side elevational view of the apparatus of FIG. 12 showing a fishing line received through the attaching device thereof; and FIG. 14 is a view similar to FIG. 13 showing the end of the fishing line tied into a knot.

DETAILED DESCRIPTION OF THE PREFERRED EMBODIMENT

Figure 1:
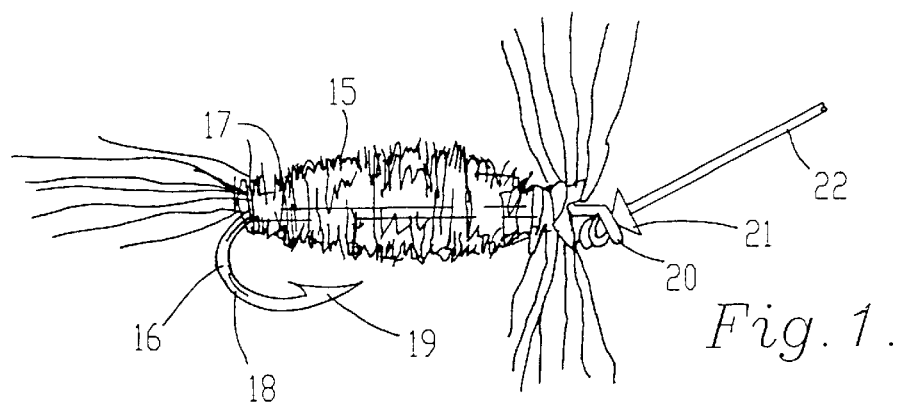
FIG. 1 is an illustration of an attaching device according to the invention installed on a fly.

Referring to FIG. 1 a conventional fly 15 includes a conventional hook 16. The hook includes an elongated shank 17 (FIG. 2) and one end of the shank is reversely curved at 18 and terminates in a barb 19. The other end of the shank is formed into a generally circular eye 20 which has a central opening.

As will be explained hereinafter, an attaching device 21 is inserted in the eye 20 and secures a line 22 to the hook. As used herein, the term "line" is used broadly to refer to a fishing line, leader, tippet, snell or other device which is commonly attached to a fish hook.

Figure 2:
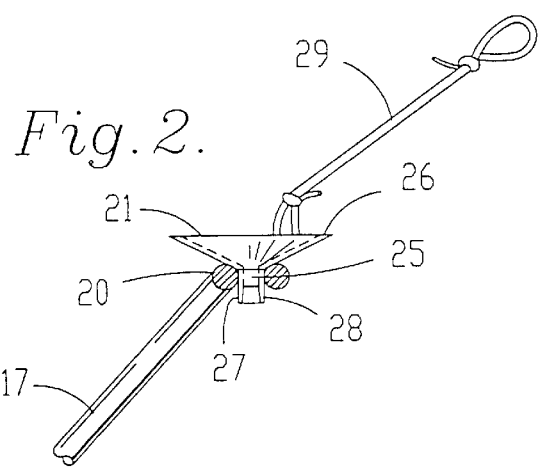
FIG. 2 is a fragmentary sectional view of a metal attaching device inserted through the eye of a fish hook.
Figure 3:
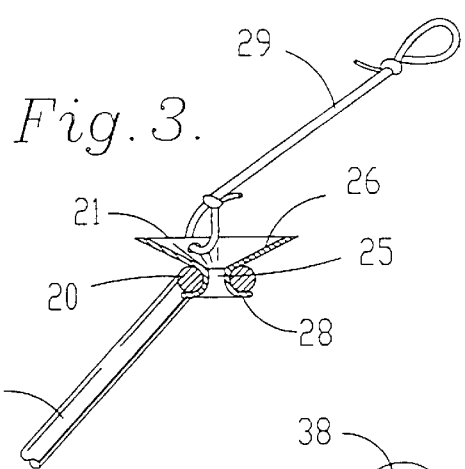
FIG. 3 is a view similar to FIG. 2 showing metal tines deformed around the eye.

Referring to FIGS. 2 and 3, the attaching device 21 includes a tubular central portion 25 which is sized to be inserted through the eye 20 and a funnel portion 26 which diverges outwardly from one end of the tubular portion. A retaining portion 27 extends from the other end of the tubular portion.

In the embodiment illustrated in FIGS. 2 and 3, the retaining portion 27 comprises a plurality of deformable tines or tabs 28 which can be bent or deformed outwardly from the tubular portion as illustrated in FIG. 3. The deformed tines are engageable with the eye 20 to restrain or prevent inadvertent withdrawal of the tubular portion 25 from the eye. The attaching device 21 is advantageously formed from metal or other deformable material.

A tab 29 is formed from string, wire, or the like is attached to the funnel portion 26 by an opening in the funnel portion. The tab facilitates storing and handling of the attaching device and can be snipped off after the attaching device is installed on a hook.

Figure 4:
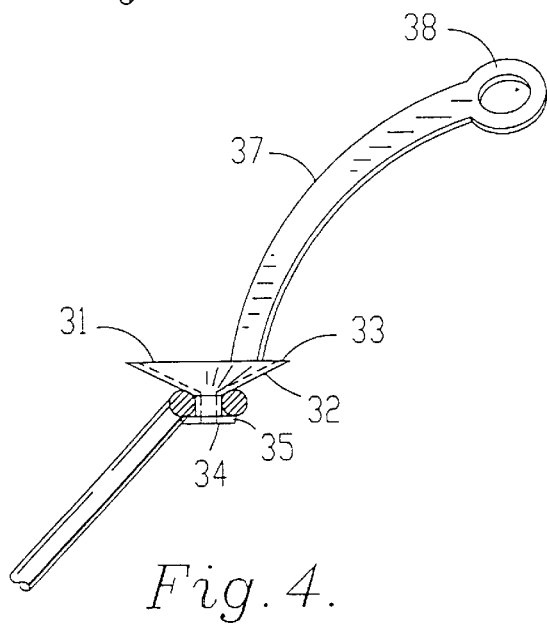
FIG. 4 is a fragmentary sectional view of a molded plastic attaching device inserted through the eye of a fish hook.
Figure 5:
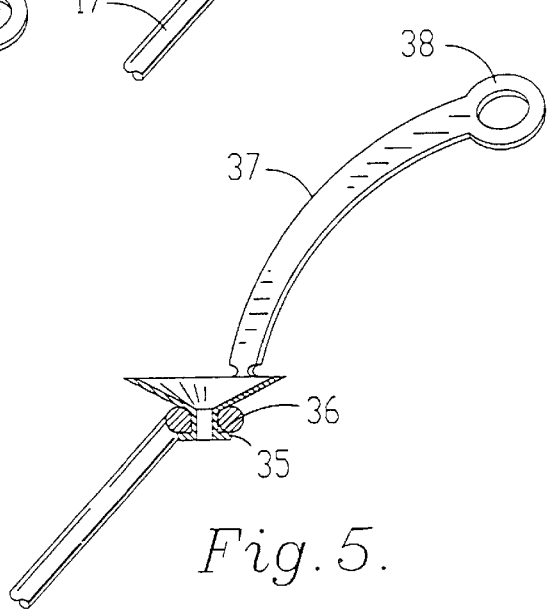
FIG. 5 is a sectional view of the attaching device of FIG. 4.

FIGS. 4 and 5 illustrate another embodiment of attaching device 31 which is advantageously injection molded from plastic. The device 31 includes a tubular central portion 32 and a funnel portion 33 similar to the corresponding parts of the device 21.

A retaining portion 34 is designed to snap through the eye and retain the device on the hook. The retaining portion is formed by an annular flange which extends outwardly from the tubular central portion and which has an outside diameter greater than the inside diameter of the eye. A frusto-conical flared surface 35 on the flange allows the flange to be cammed or wedged through the eye and a generally radially extending stop surface 36 is engageable with the eye to retain the attaching device on the hook. If desired, one or more slots can be formed in the flange 34 to facilitate inserting the flange through the eye.

A handling tab 37 is molded integrally to the funnel 33 and terminates in an eye 38. The tab can be snipped off after the attaching device is installed.

After the attaching device is installed on a hook, a line 41 (FIG. 6) is fed into the funnel and pushed through the opening in the funnel and the tubular central portion. The diameter of the opening in the tubular portion is just slightly greater than the diameter of the line. However, the diameter of the outside end or mouth of the funnel is substantially greater than the diameter of the eye 20 and the line can be easily inserted through the opening simply by feeding the end of the line into the wide mouth of the funnel. The outside diameter of the mouth is preferably at least two times the outside diameter of the tubular portion and the inside diameter of the eye 20 and more preferably about three times.

After the end of the line is inserted through the attaching device, the line is doubled back to form an end portion 42 (FIG. 7) of double thickness in order to form a larger knot. The end portion is tied in a simple loop knot 43 (FIG. 8), the knot is tightened, and the ends 44 and 45 (FIG. 9) are snipped off. The line is then pulled to draw the knot against the retaining portion of the attaching device. The diameter of the knot is substantially greater than the diameter of the opening in the attaching device and the line thereby secured to the hook.

The attaching tab 29 or 37 can be cut off either before or after the line is attached. The attaching tab reduces the likelihood that the attaching device will be dropped or lost during installation and the tab can also be used to hold the attaching device and the hook while the line is being attached.

FIG. 11 illustrates a plurality of attaching devices 31 hanging from a spring wire or clip 47. The clip includes a coil 48 and a pair of legs 49 and 50. The clip is closed by inserting the leg 49 into the U-shaped end 51 of the leg 50. Each attaching device can be removed as needed by opening the clip and sliding the tab 37 off of the leg 49. The attaching device 21 with the string or wire tab 29 can be stored in a similar manner. Other means for storing the attaching devices can also be used.

While in the foregoing specification, a detailed description of a specific embodiment of the invention was set forth for the purpose of illustration. It will be understood that many of the details herein given may be varied considerably by those skilled in the art without departing from the spirit and scope of the invention.

FIGS. 12–14 illustrate fishing tackle apparatus 60 in accordance with the present invention as another embodiment thereof. Apparatus 60 includes a fishing tackle portion in the nature of hook portion 62 integrally formed with attaching device 64. It will be appreciated that the fishing tackle portion can include any type of fishing tackle such as a lure or leader generally presenting an eye that can be integrally formed into the preferred attaching device. Hook portion 62 includes hook 66 presenting hook end 68 and shank 70 terminating at opposed end 72.

Attaching device 64 includes tubular portion 74 and a guide means in the nature of funnel portion 76. Tubular portion 74 presents inlet 78, outlet 80 and passage 82 therebetween. Funnel portion 76 includes frustoconically shaped, interior surface 84 with frustrum 86 surrounding inlet 78 with mouth 88 defined opposite frustrum 86. Surface 84 presents paths of uniform slope from mouth 88 to inlet 78 in order to guide the end of a fishing line into passage 82 and through outlet 80.

In the preferred embodiment, hook portion 62 and attaching device 64 are integrally formed. For example, a eye of a conventional metal fishhook could be stamped using conventional tool-and-die techniques to form attaching device 64.

The use and advantages of apparatus 60 are the same as described above in connection with the other embodiments. That is, the end of a fishing line such as line 90 is inserted through mouth 88 which is substantially larger than inlet 78. Interior surface 84 guides the end of a fishing line therealong through frustrum 86, into inlet 78, through passage 82, and out through outlet 80. The user then grasps the end of line 90 and pulls a sufficient amount through attaching device 64 in order to tie a knot such as illustrated in FIGS. 13 and 14.

I claim:

1. A fishing tackle apparatus comprising:

a fishing tackle portion; and an attaching device integrally formed with said fishing tackle portion, said attaching device including
   a tubular portion presenting a line-receiving inlet, a line-discharge outlet and a passage therebetween, and
   guide means coupled with said tubular portion for guiding the end of a line into said inlet and thereby through said passage and outlet,
   said guide means including a funnel portion having walls defining a frustoconically shaped interior surface, said surface, at the frustrum thereof, surrounding and presenting the same diameter as said inlet, said walls further defining a line-receiving mouth spaced from said inlet and presenting a diameter larger than said inlet, said interior surface presenting paths of uniform slope from said mouth to said inlet wherein said paths pass through said inlet and into said passage for guiding the end of a line received through said mouth through said inlet and into said passage.

2. The apparatus as set forth in claim 1, said fishing tackle portion including a hook portion presenting a hook end and an opposed end, said attaching device being integral with said opposed end.

3. The apparatus as set forth in claim 2, said hook portion having a shank terminating at said opposed end, said device presenting an axis generally parallel with said shank.

4. The apparatus as set forth in claim 2, said hook portion and attaching device being formed of metal.

5. A method of attaching a line presenting an end to a fishing tackle item having an eye presenting an inside diameter, said method comprising the steps of:

(a) inserting the end of the line into an attaching device of a fishing tackle item, said attaching device including
   a tubular portion presenting a line-receiving inlet, a line-discharge outlet and a passage therebetween, and
   guide means coupled with said tubular portion for guiding the end of a line into said inlet and thereby through said passage and outlet,
   said guide means including a funnel portion having walls defining a frustoconically shaped interior surface, said surface, at the frustrum thereof, surrounding and presenting the same diameter as said inlet, said walls further defining a line-receiving mouth spaced from said inlet and presenting a diameter larger than said inlet, said interior surface presenting paths of uniform slope from said mouth to said inlet wherein said paths pass through said inlet and into said passage for guiding the end of a line received through said mouth through said inlet and into said passage, step (a) further including the step of inserting the end of the line into said funnel portion by way of said mouth whereby said interior surface guides the line and along one of said paths into said inlet and passageway and continuing until the line end emerges from said outlet; and (b) grasping the line as it emerges from said outlet and tieing the line in a manner to couple the line with the fishing tackle item.

6. The method as set forth in claim 5, step (b) including the step of tieing the line adjacent the end into a knot having a diameter greater than that of said outlet in order to prevent passage through said outlet.

\* \* \* \* \*